United States Patent
Horigan

(10) Patent No.: US 6,384,651 B1
(45) Date of Patent: May 7, 2002

(54) METHOD OF GENERATING A SIGNAL WITH CONTROLLED DUTY-CYCLE AND PSEUDO-RANDOM SPECTRUM

(75) Inventor: John W. Horigan, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/536,906

(22) Filed: Mar. 28, 2000

(51) Int. Cl.⁷ .............................................. H03K 3/017
(52) U.S. Cl. ...................................... 327/175; 327/164
(58) Field of Search ............................... 327/164, 175, 327/365, 393, 394

(56) References Cited

U.S. PATENT DOCUMENTS

| | | | |
|---|---|---|---|
| 5,357,967 A | * 10/1994 | Dixon et al. | ................ 128/691 |
| 5,416,434 A | 5/1995 | Koostra et al. | |
| 5,546,568 A | 8/1996 | Bland et al. | |
| 5,563,573 A | * 10/1996 | Ng et al. | ..................... 338/334 |
| 5,655,127 A | 8/1997 | Rabe et al. | |
| 5,719,800 A | 2/1998 | Mittal et al. | |
| 5,884,088 A | 3/1999 | Kardach et al. | |

* cited by examiner

Primary Examiner—Kenneth B. Wells
(74) Attorney, Agent, or Firm—Blakely, Sokoloff, Taylor & Zafman LLP

(57) ABSTRACT

A method is disclosed including generating a digital control signal having a duty cycle which varies randomly or pseudo-randomly between a number of cycles, and is substantially fixed when averaged over the cycles. A target signal such as a digital clock signal may be passed selectively, in accordance with the control signal. A particular application of the method is power management in computers and other electronic systems that feature high performance processor and memory configurations that involve synchronous accesses of the memory by the processor.

27 Claims, 5 Drawing Sheets

METHOD OF GENERATING A SIGNAL WITH CONTROLLED DUTY-CYCLE AND PSEUDO-RANDOM SPECTRUM

FIELD OF THE INVENTION

This invention is generally related to the control of power consumption in data processing circuitry, and more particularly to controlling power consumption in clocked, high speed logic circuits that feature synchronous and precisely timed accesses.

BACKGROUND INFORMATION

Modern, complex, high speed logic circuits, such as a processor and memory combination in a computer system, can consume a significant amount of power. In certain cases, such as the processor becoming too hot or, in portable systems, a battery being depleted too quickly, it is desirable to reduce the power consumption yet still allow data processing to continue albeit at a reduced throughput.

A technique known as stop clock throttling periodically shuts off an on-chip clock fed to certain logic units in the processor chip. This is done by qualifying or switching the on-chip clock signal in accordance with a periodic stop clock signal. Since the logic units operate only in the presence of the on-chip clock, the logic units are essentially disabled, and processing is halted, during the interval in which the stop clock signal is asserted. Processing resumes when the stop clock is deasserted. By appropriately selecting the duty cycle of the stop clock signal, power consumption can be controlled while still allowing processing to continue at reduced throughput.

A problem with conventional stop clock throttling, however, occurs when the frequency of the stop clock signal is in the relatively broad human audible range of a few tens of hertz to several thousands of hertz. The stop clock signal causes periodic surges in the power consumption of the computer system. This in turn leads to power components such as inductors in the computer system to physically oscillate in accordance with the stop clock signal and thereby emit a constant but annoying audible tone.

BRIEF DESCRIPTION OF THE DRAWINGS

The invention is illustrated by way of example and not by way of limitation in the figures of the accompanying drawings in which like references indicate similar elements. It should be noted that references to "an" embodiment in this disclosure are not necessarily to the same embodiment, and they mean at least one.

DETAILED DESCRIPTION

Various embodiments of an apparatus and a method for generating a control signal having a duty cycle which (1) varies either randomly or pseudo-randomly between a number of cycles, and (2) is substantially fixed when averaged over the cycles, are disclosed. In a particular embodiment, the control signal may be used to selectively pass a target clock signal to a logic unit of an electronic system, helping significantly reduce and perhaps even eliminate any substantial audible tones.

Figure 1:
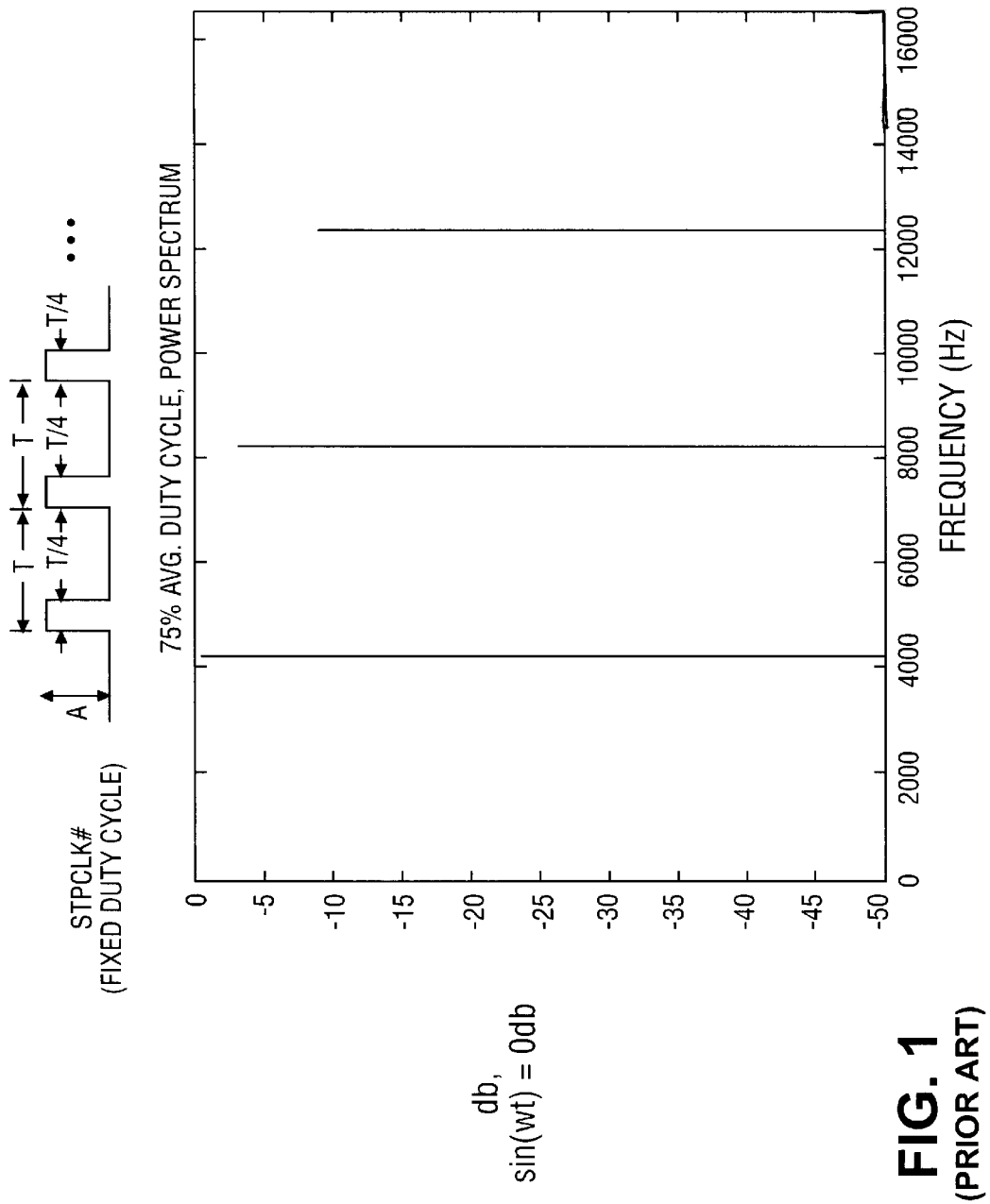
FIG. 1 shows the spectrum of an exemplary square wave with 75% duty cycle.
Figure 2:
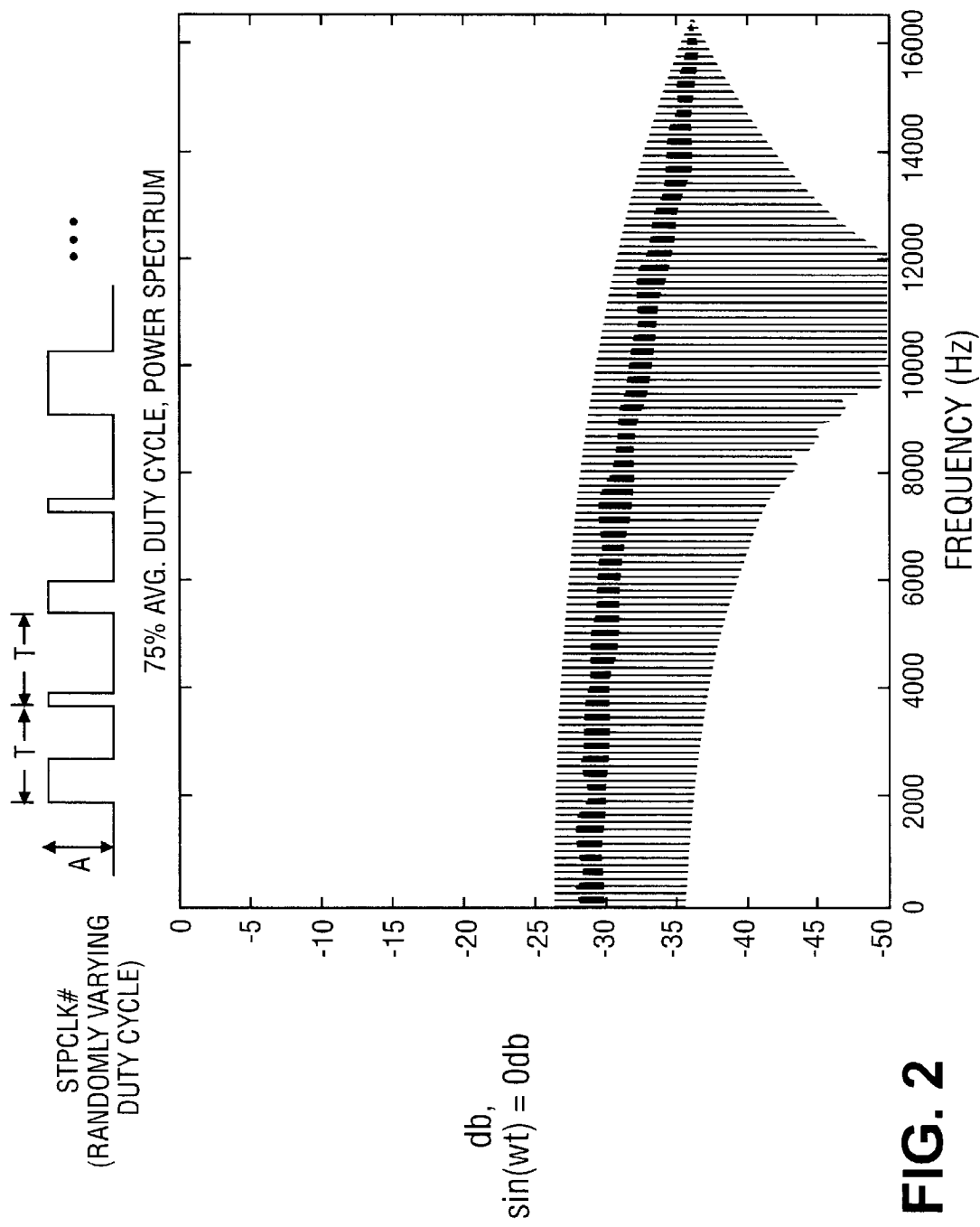
FIG. 2 is a plot of the spectrum of a pseudo-random signal having a 75% average duty cycle.
Figure 3:
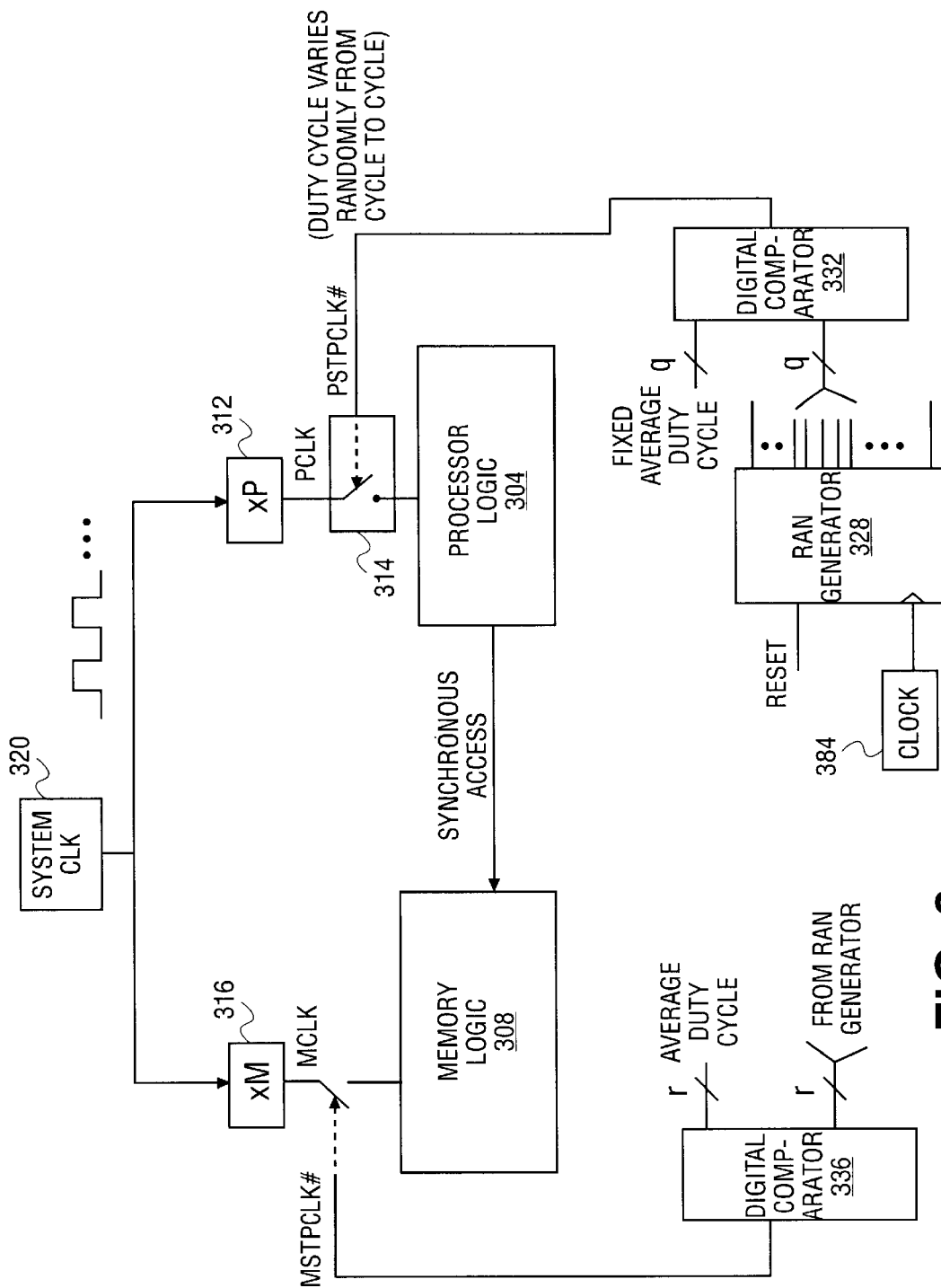
FIG. 3 illustrates a block diagram of an electronic system configured with an embodiment of a technique for generating a control signal having a pseudo random spectrum.

FIG. 1 illustrates the spectrum of a control signal STP-CLK# having fixed duty cycle. It can be seen that the STPCLK# has a period T and a pulse width T/4, thus defining a digital control signal having a 75% fixed duty cycle. The control signal has a fundamental component at 4 kHz as seen in the power spectrum plot, a first harmonic at 8 kHz, and additional components a little over 12 kHz, and so on. In contrast, FIG. 2 illustrates the spectrum of the digital control signal according to an embodiment of the invention, in which the duty cycle randomly varies yet averages out to approximately 75%. It can be seen by comparing FIGS. 2 and 1 that the randomly varying control signal exhibits a fuller spectrum but one which is substantially smaller in magnitude, namely more than 25 decibels (dB) smaller than the fundamental 4 kHz component in FIG. 1, for the same amplitude A. This significant reduction in the amplitude of the power spectrum of the STPCLK# signal helps significantly reduce and perhaps even eliminate any substantial audible tones at 4 kHz and 8 kHz which are in the human audible frequency range of a few Hz to 15 kHz. FIG. 3 shows a particular implementation of an electronic system for generating and using such a control signal to selectively pass a target signal.

What is shown in FIG. 3 is an electronic system having processor logic 304 which can synchronously access memory logic 308 with reference to a system clock 320. A logic unit such as processor logic 304 is coupled to receive a target clock signal PCLK from a gate circuit 314, where in this case the logic unit is part of a processor in an integrated circuit (IC) die. The processor and memory logic are driven by separate digital clock signals PCLK and MCLK, respectively. These clock signals are derived using clock multiplier circuits 312 and 316 respectively. The multiplier circuits increase the frequency of a fixed frequency, reference signal obtained from a system clock 320.

Figure 4:
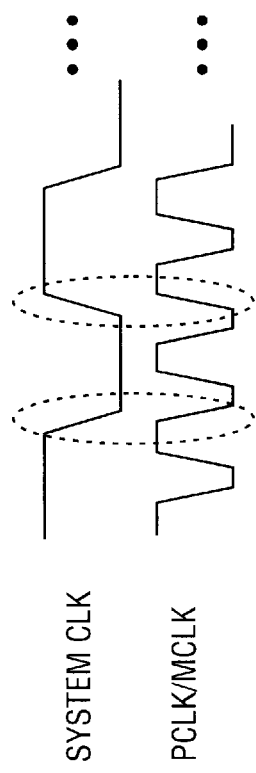
FIG. 4 depicts the phase lock relationship between a system clock and the one or more target clocks for an application of the digital control signal having a pseudo-random spectrum.

It should be noted that in most applications the system clock frequency will be fixed, so that PCLK and MCLK will also have a fixed fundamental frequency. Moreover, in very high performance electronic systems which have synchronous access to memory as shown in the embodiment of FIG. 3, the PCLK and MCLK signals are phase locked by the multiplier circuits 312 and 316, respectively, to the system clock signal. This aspect is illustrated in FIG. 4 in which the rising and/or falling edges of the system clock are shown as being closely synchronized with corresponding rising and falling edges of MCLK and PCLK. The frequency of the system clock may be in any range which can be precisely controlled by, for instance, a crystal controlled technique. The multiplier circuits 312 and 316 may multiply the system clock signal frequency to one or more orders of magnitude greater than a substantial part of the spectral content of the PSTPCLK#/MSTPCLK# (now referred to as simply STPCLK#) signal. For instance, the STPCLK# signal may have a range of 16 kHz as illustrated in FIG. 2, while the PCLK obtained by multiplier 312 is in the hundreds of MHz and the MCLK obtained by the multiplier 316 is at 100

MHz. These numbers are, of course, merely exemplary as the spectrum of the STPCLK# signal may be greater than 16 kHz, depending upon the technique used for randomly changing the duty cycle. Also, the frequencies of PCLK and MCLK will likely increase in the coming years as processor and memory circuits continue to evolve and operate at higher speeds. The processor and memory logic may be part of a motherboard in a personal computer system. In general, however, the control signal with randomly varying duty cycle may be used in a wide range of different types of electronic systems as well as electromechanical systems which may benefit from reduced power consumption or reduction of unwanted resonant effects that might appear at relatively high power levels in the control signal.

Figure 5:
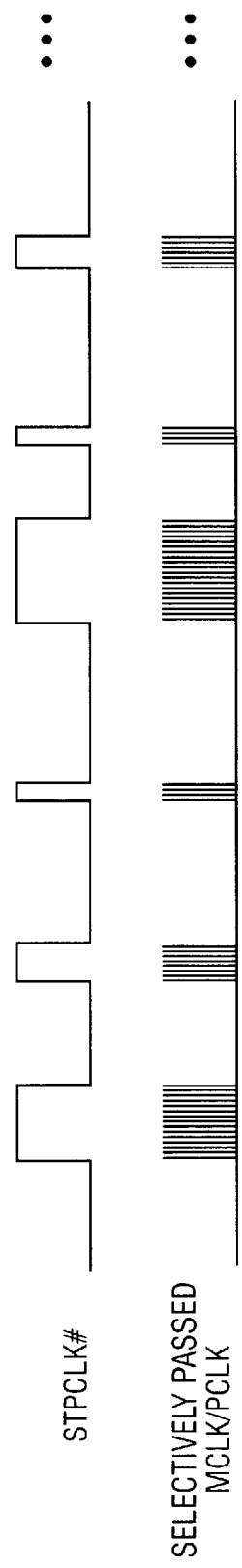
FIG. 5 shows a time domain plot of a digital control signal having pseudo-randomly varying pulse width and a selectively passed target clock signal.

The power consumption in the electronic system of FIG. 3 may be adjusted by changing the average value of the duty cycle of PSTPCLK# and/or MSTPCLK# in response to a request to alter power consumption. This may be achieved using the apparatus shown in FIG. 3 where a pseudo random or random (RAN) number generator 328 is capable of generating a sequence of RAN numbers in accordance with a signal received from a clock generator 324. In a particular embodiment, the RAN number generator includes a linear feedback shift register (LFSR) that's clocked by the clock generator 324. The sequence of RAN numbers are obtained from a number q of the output bits of the LFSR and are fed to an input of a digital comparator 332. Another input of the digital comparator 332 receives a "fixed" number. This number represents an average duty cycle and is fixed relative to the clock 324 which drives the RAN generator 328. The digital comparator 332 has an output that continuously provides a comparison between the fixed number and a RAN number in the sequence. The output of the comparator 332 is essentially the STPCLK# signal whose duty cycle varies randomly from cycle to cycle. The STPCLK# signal need not be strictly periodic, because its cycles are loosely defined and need not be of fixed time intervals. This STPCLK# signal is then used to selectively pass a target clock signal (e.g. PCLK or MCLK) as depicted by a gate circuit 314 in FIG. 3. Although shown as a switch, the gate circuit 314 as a mechanism for selectively, i.e. on or off, passing the target clock signal may be a solid state switch or a logic gate, such as an AND gate. There may be a wide range of different gate circuits that can receive the target signal and are capable of selectively passing the target signal in accordance with the STPCLK# signal. For instance, the gate circuit 314 may also feature synchronization circuitry (not shown) to ensure that the asynchronously appearing transitions of STPCLK# result in the target clock signals being inhibited at the appropriate time, so that the state of the logic unit at the time the target clock signal is inhibited will remain consistent with its state upon the reappearance of the target clock signal when STPCLK# is deasserted. The effect of qualifying a target clock signal such as PCLK or MCLK with the STPCLK# signal is illustrated, in the time domain, in FIG. 5. In FIG. 5, it can be seen that when PSTPCLK# is asserted, i.e. driven to a "low" level as shown, PCLK is "shut down", i.e. not passed, such that a DC voltage level is observed at the output of the gate circuit 314 during such intervals.

In another embodiment of the invention, the action of PSTPCLK# may be mediated by software being executed by the processor. In that case, the functionality of the gate circuit 314 may be implemented in both hardware and software. The PSTPCLK# signal triggers a software interrupt which prepares the processor for PCLK shutdown, and then sends a command to hardware to actually shutdown PCLK.

Returning briefly to FIG. 3, it can be seen that a similar arrangement using a second digital comparator 336 may be used to generate a second STPCLK# signal, MSTPCLK#, based upon the same or a different set of r bits from the RAN generator 328. The r bits taken from the generator 328 for MSTPCLK# may be the same as the q bits used to generate PSTPCLK#, or they may be a different set of bits. They should be selected so that not only is the desired power consumption achieved in the electronic system, but also a desired data processing throughput is achieved as well. Note that the lower the average duty cycle, the lower the data processing throughput. In addition, for the particular embodiment shown in FIG. 3 involving processor and memory logic, the RAN generator and its clock 324 as well as the r and q bits should be selected so that PSTPCLK# and MSTPCLK# are asserted and deasserted simultaneously, so that when processor logic 304 is enabled, the memory logic 308 is also enabled, thus enabling synchronous access of the memory by the processor.

Figure 6:
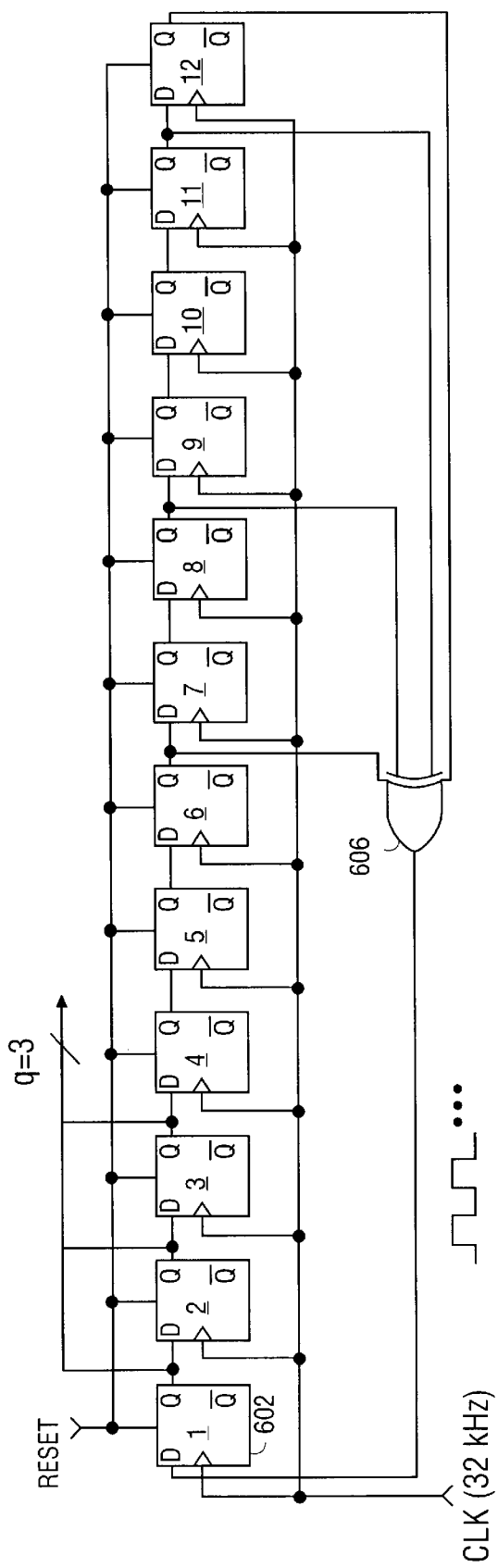
FIG. 6 shows a circuit schematic of a linear feedback shift register.

Turning now to FIG. 6, what's illustrated here is a circuit schematic of an exemplary embodiment of the RAN generator 388 being an LFSR for generating the control signal having the random or pseudo-randomly varying duty cycles. The LFSR includes a chain of G flip flops 602 each receiving the same clock signal and reset signal. The q output bits are pseudo-randomized using a four input XOR gate 606 to feed back a new bit value in every cycle of the clock. In this particular embodiment, a digital control signal having a variable average duty cycle that is a multiple of 12.5%, i.e. 12.5%, 25%, 37.5%, 50%, . . . ) is obtained by simply selecting the three bit digital value that is input to the comparator 332 (see FIG. 3). The 3 bits thus provide eight different average duty cycles, allowing eight different power consumption/data processing throughput levels to be available for the electronic system shown in FIG. 3. In FIG. 6, a standard 12-bit linear feedback shift register is clocked at 32 kHz, and q=3 bits are extracted for comparison against a fixed 3-bit desired duty cycle. The output of the comparator 332 is asserted (i.e. driven low) when the LFSR output is less than the 3 bit fixed value cycle number. Note that the value represented by the 3 bits of the LFSR may change at a frequency of 32 kHz, and what results at the output comparator is a digital control signal that has the desired average duty cycle, but a pseudo-random distribution of logic low and high levels. Note that other duty cycles may alternatively be generated using the same scheme, by extracting fewer or greater bits from the LFSR. In addition, other means of generating pseudo-random or random number sequences may be used, such as using linear hybrid cellular automata (LHCA). Thus, the invention need not be limited by the particular type of circuit or software used to generate the RAN number sequences. More generally, the functionality of the RAN generator 328 and the comparator 332 may be implemented by a system under software/firmware control, where instructions for the functionality are stored on a machine-readable medium such as a solid state memory or a rotating disk.

The selection of the clock frequency for running the LFSR shown in FIG. 6, as well as the size of the LFSR (given by a number G of flip flops), may be made by taking into account that the LFSR is a pseudo-random, rather than truly random, number generator in that the sequence of random numbers will repeat every $2^{12}$=4,096 clock cycles. Thus, for example, the use of a 32 kHz clock in this case results in a 32,000/4,096=8 Hz beat to the essentially white noise generated by the 12-bit LFSR. The use of a pseudo-random generator such as the 12 bit LFSR thus creates a relatively low amplitude 8 Hz beat which may still be audible. This beat tone may be made inaudible by adding more bits to the LFSR, such that the beat frequency is significantly reduced to less than 1 Hz. This may call for an increase in the number of bits, G, from 12 to 20 which will reduce the beat frequency to a relatively small and therefore almost unnoticeable 0.03 Hz.

To summarize, various embodiments of a technique for generating a digital control signal having a controlled, average duty cycle with random or pseudo-random spectrum have been described. In particular, an application of the control signal in electronic data processing systems for selectively passing a target clock signal to a logic unit has been described. More generally, however, the digital control signal may be used not only for power management of electronic systems, but also for controlling an electromechanical device that may exhibit unwanted resonant behavior at certain frequencies in the spectrum of the control signal. In such a case, the target signal would not be a clock signal, but rather another type of control signal such as perhaps an analog signal which is applied to control an electromechanical device such as an actuator. In such a case, the relatively low power levels in the spectrum of the control signal, such as that shown in FIG. 2, help reduce or even completely suppress the resonant behavior which may otherwise surface at higher power levels (such as that shown in FIG. 1).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:

generating a first control signal having a duty cycle which (1) varies one of randomly and pseudo-randomly between a plurality of cycles, and (2) is substantially fixed when averaged over the plurality of cycles;

selectively passing a first target signal in accordance with the first control signal;

receiving a request to adjust power consumption in an electronic system that contains a logic unit that operates in accordance with the first target signal; and changing an average value of the duty cycle in response to the request.

2. The method of claim 1 wherein the first target signal is a clock signal.

3. The method of claim 2 wherein the first target signal has a fundamental frequency that is substantially fixed.

4. The method of claim 2 wherein the first target signal has a fundamental frequency that is one or more orders of magnitude greater than a frequency of a substantial part of the spectral content of the first control signal.

5. The method of claim 4 wherein the spectral content of the first control signal in part overlaps some of the human audible frequency range.

6. The method of claim 2 further comprising:

phase locking the first target clock signal to a system clock signal.

7. The method of claim 6 wherein the system clock signal has a fundamental frequency that is smaller than a fundamental frequency of the first target signal.

8. The method of claim 6 further comprising:

phase locking a second target signal to the system clock signal;

generating a second control signal having a duty cycle which (1) varies one of randomly and pseudo-randomly between a plurality of cycles, and (2) is substantially fixed when averaged over the plurality of cycles; and selectively passing the second target clock signal to a second logic unit in accordance with the second control signal.

9. The method of claim 8 wherein the second target clock signal has a different frequency than the first target signal.

10. An apparatus comprising:

a pseudo-random/random (RAN) number generator capable of generating a sequence of RAN numbers in accordance with a clock signal;

a comparator having a first input coupled to receive the sequence of RAN numbers from the generator, a second input to receive a fixed number within the sequence, and an output to provide a comparison between the fixed number and the RAN number; and a gate circuit having an input to receive a first target signal and capable of selectively passing the first target signal in accordance with the comparison.

11. The apparatus of claim 10 wherein the input of the gate circuit is to receive the first target signal as digital clock signal.

12. The apparatus of claim 10 wherein the RAN number generator includes a feedback shift register (FSR) to be clocked by the clock signal, the sequence of random numbers to be obtained from a plurality of output bits of the LFSR.

13. The apparatus of claim 11 further comprising:

an integrated circuit die in which a processor has a first logic unit coupled to receive the first target signal from the gate circuit.

14. The apparatus of claim 13 further comprising a clock multiplier circuit whose output is to provide the first target signal with a fundamental frequency that is one or more orders of magnitude greater than frequencies of a substantial part of the spectral content of the first control signal.

15. The apparatus of claim 14 wherein the spectral content of the first control signal in part overlaps some of the human audible frequency range.

16. The apparatus of claim 12 further comprising a frequency control circuit whose output is to provide the first target signal as being phase locked to a system clock signal.

17. The apparatus of claim 16 wherein the frequency control circuit is to provide fundamental frequency of the first target signal as being greater than that of the system clock signal.

18. An apparatus comprising:

means for generating a first control signal having a duty cycle which (1) varies one of randomly and pseudo-randomly between a plurality of cycles, and (2) is substantially fixed when averaged over the plurality of cycles;

means for selectively passing a first target signal in accordance with the first control signal; and an integrated circuit die in which a processor has a first logic unit coupled to receive the first target signal from the passing means.

19. The apparatus of claim 18 further comprising means for generating the first target signal as a clock signal.

20. The apparatus of claim 18 further comprising means for generating the first target signal with a fundamental frequency that is one or more orders of magnitude greater than frequencies of a substantial part of the spectral content of the first control signal.

21. The apparatus of claim 18 wherein the spectral content of the first control signal in part overlaps some of the human audible frequency range.

22. The apparatus of claim 18 further comprising means for generating the first target signal as being phase locked to a system clock signal.

23. The apparatus of claim 22 further comprising means for generating the system clock signal as having a fundamental frequency that is smaller than a fundamental frequency of the first target signal.

24. The apparatus of claim 22 further comprising:

means for generating a second control signal having a duty cycle which (1) varies one of randomly and pseudo-randomly between a plurality of cycles, and (2) is substantially fixed when averaged over the plurality of cycles; and means for selectively passing a second target clock signal in accordance with the second control signal.

25. The apparatus of claim 24 wherein the second target clock signal is phase locked to the system clock signal.

26. An article of manufacture comprising:

a machine-readable medium having instructions stored therein which, when executed by a processor, cause a system to generate a first control signal having a duty cycle which (1) varies one of randomly and pseudo-randomly between a plurality of cycles, and (2) is substantially fixed when averaged over the plurality of cycles, selectively pass a first target signal in accordance with the first control signal, receive a request to adjust power consumption in said system that contains a logic unit that operates in accordance with the first target signal, and change an average value of the duty cycle in response to the request.

27. The article of manufacture of claim 26 wherein the machine-readable medium includes further instructions which, when executed by the processor, cause the system to interrupt a processor in the logic unit prior to inhibiting the first target signal.

* * * * *

UNITED STATES PATENT AND TRADEMARK OFFICE
CERTIFICATE OF CORRECTION

PATENT NO.   : 6,384,651 B1
DATED        : May 7, 2002
INVENTOR(S)  : Horigan

It is certified that error appears in the above-identified patent and that said Letters Patent is hereby corrected as shown below:

Column 6,
Line 46, delete "apparatus of claim 12" and insert -- apparatus of claim 11 --.

Signed and Sealed this

Fifteenth Day of October, 2002

Attest:

Attesting Officer

JAMES E. ROGAN
*Director of the United States Patent and Trademark Office*